/ Patented Aug. 24, 1954

2,687,415

UNITED STATES PATENT OFFICE 2,687,415

4-SUBSTITUTED-2-CHLORO-5-BENZYL-PYRIMIDINE COMPOUNDS

Aaron S. Goldberg, New York, N. Y., assignor to Nepera Chemical Co., Inc., Yonkers, N. Y., a corporation of New York No Drawing. Application April 3, 1952, Serial No. 280,391

12 Claims. (Cl. 260—256.4)

This invention relates to the preparation of certain novel pyrimidine compounds and relates more particularly to the production of novel 2-chloro-5-benzylpyrimidine compounds which are further substituted in the 4-position.

Compounds containing a pyrimidine nucleus are of wide pharmacologic interest since compounds containing the basic pyrimidine structure are known to play an important part in physiological processes. Compounds containing the pyrimidine structure are present in the cell nucleus in the form of nucleoproteins. Vitamin $B_1$, folic acid, and thymine are other important natural substances of pyrimidine structure. Although the study of the physiologically active pyrimidine compounds has occupied the attention of many investigators, the usefulness of many compounds which come within the broad class of pyrimidine compounds has by no means been fully determined since it is well known that relatively small changes in the structure of pyrimidine compounds have been found to cause widely different physiological effects.

It is, therefore, an important object of my invention to provide certain novel 4-substituted-2-chloro-5-benzylpyrimidine compounds having desirable physiological activity.

Another object of my invention is the provision of certain novel 4-substituted-2-chloro-5-benzylpyrimidine compounds which may be employed as intermediate compounds in the preparation of other physiologically-active substituted pyrimidine compounds.

Other objects of this invention will appear from the following detailed description.

The novel pyrimidine compounds of my invention may be represented by the following formula:

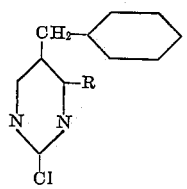

wherein R is a substituted amino group. Thus, for example, R may be a methylamino group, an ethylamino group or other alkylamino group wherein the alkyl group contains up to about six carbon atoms, a cyclohexylamino group, a furfurylamino group, a piperidino group, a benzylamino group, a β-phenylisopropylamino group, a hydroxyethylamino group, etc. The novel compounds of my invention have been found to exhibit desirable physiological activity, and, for example, have been found to act as blood pressure depressants in laboratory animals.

The novel compounds of my invention may be prepared, for example, by condensing ethyl hydrocinnamate:

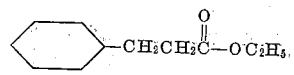

with ethyl formate to obtain the intermediate compound ethyl α-formyl hydrocinnamate;

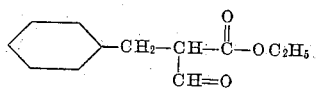

This intermediate may then be reacted with urea, for example, in alcoholic solution and in the presence of some hydrogen chloride to yield the intermediate ethyl α-benzyl β-ureido acrylate

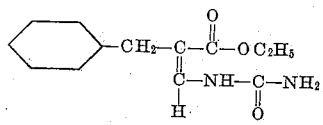

Upon heating the above compound in the presence of a base, such as, for example, 10% aqueous sodium hydroxide, ring closure takes place with the formation of 5-benzyluracil. Treatment of the 5-benzyluracil with phosphorus oxychloride yields 2,4-dichloro-5-benzylpyrimidine which by reaction with a suitable amine can then be converted to the novel compounds of my invention.

In order further to illustrate my invention but without being limited thereto, the following examples are given:

Example I 67 parts by weight of sodium metal and 2 parts by weight of potassium metal are placed in a reaction vessel, sufficient toluene added to cover the metal and the mixture then heated with some agitation until the sodium and potassium are melted. The toluene is then decanted from the molten alloy and a mixture of 375 parts by weight of ethyl hydrocinnamate, 350 parts by weight of ethyl formate and 850 parts by weight of diethyl ether are gradually added to the sodium-potassium alloy. The addition is made under reflux and at a rate sufficient to maintain the exothermic reaction mixture at a lively boil. Hydrogen is given off as a reaction product. When the addition of the ester mixture is completed and the evolution of hydrogen ceases, the reaction mixture is allowed to reflux for a period of about 1 hour. The mixture is poured on to ice, the aqueous phase separated from the ether phase, and, after washing the ether phase once with dilute aqueous sodium hydroxide, the ether phase is discarded. The aqueous sodium hydroxide phases are combined, acidified with cold hydrochloric acid and the combined acidified aqueous phase then extracted with ether. The ether layer is separated and the ether evaporated under reduced pressure. The formyl ester is then distilled under a pressure of 1 mm. or less. A yield of 70% of ethyl α-formyl hydrocinnamate is obtained as the product.

100 parts by weight of the ethyl α-formyl hydrocinnamate thus obtained are added to a mixture containing 35 parts by weight of urea, 235 parts by weight of absolute ethyl alcohol and 6 parts by weight of ethyl alcohol which has been saturated with hydrogen chloride at 20° C. The mixture thus formed is heated at 50–60° C. for about one hour and, after being allowed to stand at a temperature of about 40° C. for about 12–20 hours, followed by standing for about 16 hours at a temperature of 0–5° C., ethyl α-benzyl β-ureido acrylate crystallizes out. The crystals are filtered, washed with 50% aqueous ethyl alcohol and then with a small amount of ether.

32 parts by weight of the ethyl α-benzyl β-ureido acrylate are place in a suitable reaction vessel and 54 parts by weight of a 2 N. aqueous solution of sodium hydroxide are added. Heating is continued at the boiling point for about 30 minutes. The mixture is acidified with warmed 2 N. aqueous hydrochloric acid. A precipitate of 5-benzyluracil is obtained on acidification. The mixture is cooled, the 5-benzyluracil is filtered off and the latter then washed with water and dried. The 5-benzyluracil may then be converted to 2,4-dichloro-5-benzylpyrimidine by reacting the former with an excess phosphorus oxychloride under reflux for about 3 hours. To separate the 2,4-dichloro-5-benzylpyrimidine, the reaction mixture is reduced in volume by heating under reduced pressure until it becomes slightly syrupy. The syrupy liquid is then diluted with some chloroform, ice is added and, after agitation, the aqueous and chloroform phases are separated. The chloroform layer is washed several times with ice water and dried with sodium sulfate. After boiling off the chloroform, 2,4-dichloro-5-benzylpyrimidine is obtained and may be further purified by distillation under vacuum. This compound has a boiling point of 160° C. under 1 mm. pressure.

*Example II*

2 parts by weight of 2,4-dichloro-5-benzylpyrimidine are dissolved in 6.5 parts by weight of ethyl alcohol and 7 parts by weight of a 33% by weight aqueous solution of methyl amine are added gradually so that the temperature does not rise above 40° C. The precipitate of 2-chloro-4-methylamino-5-benzylpyrimidine which forms on addition of the methylamine is filtered, washed well with water, and then with diethyl ether. The product may be recrystallized from ethyl alcohol. A yield of 97% of theory is obtained This novel pyrimidine compound has a melting point of 166° C.

*Example III*

To 5 parts by weight of 2,4-dichloro-5-benzylpyrimidine are added a mixture of 9 parts by weight of benzene and 4.75 parts by weight of cyclohexylamine. After the mixture is allowed to stand for one hour at a temperature of 20° C., 50 parts by weight of diethyl ether are added and the resulting mixture extracted with four successive portions of 20 parts by weight of water. The ether layer is then dried over sodium sulfate, concentrated, and petroleum ether is added to incipient crystallization. After standing for a period of 16 hours at a temperature between 0° and 5° C., crystals of 2-chloro-4-cyclohexylamino-5-benzylpyrimidine form and are filtered off and washed with a small volume of cold ether. The yield is 65% of theory, the product melting at 94° C.

*Example IV*

6 parts by weight of 2,4-dichloro-5-benzylpyrimidine and 13 parts by weight of benzene are added to a suitable vessel, the air is exhausted by use of a suitable vacuum pump and then 4.73 parts by weight of piperidine are slowly added. A strong exothermic reaction takes place which causes some benzene to be evaporated. During the reaction the mixture should be maintained at a temperature below about 30° C., by cooling if necessary. After one-half hour the vacuum is broken, 60 parts by weight of diethyl ether and 30 parts by weight of water are added, the mixture agitated and the ether layer separated. The water washings are continued until the water is not more than slightly alkaline. The ether phase is then dried over anhydrous sodium sulfate and reduced to a small volume. The 2-chloro-4-piperidino-5-benzylpyrimidine present is separated by the addition of petroleum ether to the point of precipitation followed by cooling at 0–5° C. for 16 hours. A yield of 58% of theory of 2-chloro-4-piperidino-5-benzylpyrimidine is obtained. This novel compound has a melting point of 68° C.

*Example V*

4 parts by weight of 2,4-dichloro-5-benzylpyrimidine, 8.79 parts by weight of benzene and 3.5 parts by weight of furfurylamine are reacted in the absence of air in accordance with the procedure described in Example IV. A yield of 3.6 parts by weight of 2-chloro-4-furfurylamino-5-benzylpyrimidine is obtained, i. e. 72% of theory. This novel compound melts at 80° C.

*Example VI*

4.4 parts by weight of benzene are added to 5 parts by weight of 2,4-dichloro-5-benzylpyrimidine and then 4.9 parts by weight of benzylamine slowly added in a stepwise fashion. After the reaction mixture has been allowed to stand for about one-half hour, 60 parts by weight of diethyl ether and 25 parts by weight of water are added to the reaction mixture. After agitation, the ethereal phase is separated. The ether phase is washed several more times with water and then dried over anhydrous sodium sulfate. The dried ether phase is then concentrated, petroleum ether added to incipient crystallization, and the 2-chloro-4-benzylamino-5-benzylpyrimidine present is permitted to crystallize out by maintaining the resulting solution at a temperature of 0–5° C. for 16 hours. The 2-chloro-4-benzylamino-5-benzylpyrimidine obtained may then be recrystallized from ethyl alcohol. A yield of 4.35 parts by weight of the latter compound is obtained which is 67% of theory. This novel compound has a melting point of 118° C.

*Example VII*

2.4 parts by weight of the neutral sulfate of β-phenyl isopropylamine are mixed with about 8 parts by weight of water and the mixture saturated with potassium hydroxide. The aqueous mixture formed is extracted several times with 4 parts by weight of benzene each time and the benzene extracts combined. The combined benzene extracts are then added to 2 parts by weight of 2,4-dichloro-5-benzylpyrimidine, the mixture obtained maintained at 20° C. for 16 hours and then heated under reflux for one hour. The reaction mixture is cooled, 30 parts by weight of ether added, and the mixture is washed three times with about 15 parts by weight of water and then dried over anhydrous sodium sulfate. The major part of the ether is evaporated and, if necessary, some petroleum ether is added to initiate crystallization. The crystals formed are filtered, and washed then with a 50% by weight mixture of ether and petroleum ether. A yield of 1.95 parts by weight of 2-chloro-4-(β-phenylisopropylamino)-5-benzylpyrimidine is obtained, which is 69% of theory. This novel compound has a melting point of 120° C.

It is to be understood that the foregoing detailed description is given merely by way of illustration and that many variations may be made therein without departing from the spirit of my invention.

Having described my invention, what I desire to secure by Letters Patent is:

1. 2-chloro-5-benzylpyrimidine containing a substituted amino group in 4-position which is a member of the group consisting of alkylamino containing 1 to 6 carbon atoms in the alkyl group, hydroxy lower alkylamino, cyclohexylamino, piperidino, furfurylamino, benzylamino and beta-phenyl-isopropyl amino radicals.

2. 2-chloro-4-cyclohexylamino-5-benzylpyrimidine.

3. 2 - chloro - 4 - furfurylamino - 5 - benzylpyrimidine.

4. 2-chloro-4-piperidino-5-benzylpyrimidine.

5. 2-chloro-4-benzylamino-5-benzylpyrimidine.

6. 2 - chloro - 4 - (β - phenylisopropylamino) - 5 - benzylpyrimidine.

7. Process for the production of 2-chloro-5-benzylpyrimidine compounds containing a substituted amino group in 4-position, which comprises reacting 2,4-dichloro-5-benzylpyrimidine with an amine selected from the group consisting of an alkylamine wherein the alkyl group contains 1 to 6 carbon atoms, a hydroxy lower alkylamine, cyclohexylamine, piperidine, furfurylamine, benzylamine, and beta-phenyl-isopropyl amine.

8. Process for the production of 2-chloro-4-cyclohexylamino-5-benzylpyrimidine which comprises reacting 2,4-dichloro-5-benzylpyrimidine with cyclohexylamine.

9. Process for the production of 2-chloro-4-furfurylamino-5-benzylpyrimidine which comprises reacting 2,4-dichloro-5-benzylpyrimidine with furfurylamine.

10. Process for the production of 2-chloro-4-piperidino-5-benzylpyrimidine which comprises reacting 2,4-dichloro-5-benzylpyrimidine with piperidine.

11. Process for the production of 2-chloro-4-benzylamino-5-benzylpyrimidine which comprises reacting 2,4-dichloro-5-benzylpyrimidine with benzylamine.

12. Process for the production of 2-chloro-4-(β - phenylisopropylamino) - 5 - benzylpyrimidine, which comprises reacting 2,4-dichloro-5-benzylpyrimidine with β-phenyl isopropylamine.

References Cited in the file of this patent

Richter, Textbook of Organic Chemistry, 1938 ed., p. 9, published by John Wiley and Sons, New York, N. Y.